United States Patent [19]

Jordan

[11] Patent Number: 4,540,159

[45] Date of Patent: Sep. 10, 1985

[54] HYDROPNEUMATIC CABLE TENSIONER

[75] Inventor: Larry B. Jordan, Houston, Tex.

[73] Assignee: Retsco, Inc., Houston, Tex.

[21] Appl. No.: 516,102

[22] Filed: Jul. 22, 1983

[51] Int. Cl.³ .......................... B25B 25/00; B66D 1/50
[52] U.S. Cl. ..................................... 254/228; 254/277; 254/386; 254/392
[58] Field of Search ............... 254/228, 272, 277, 386, 254/392; 92/143

[56] References Cited

U.S. PATENT DOCUMENTS

| | | | |
|---|---|---|---|
| 2,588,037 | 3/1952 | Orton, Sr. | 242/47.5 |
| 3,120,157 | 2/1964 | Mello | 91/408 |
| 3,314,657 | 4/1967 | Prud'homme et al. | 254/189 |
| 3,403,728 | 10/1968 | Richardson et al. | 254/277 X |
| 3,912,227 | 10/1975 | Meeker et al. | 254/277 X |
| 4,145,959 | 3/1979 | Burden et al. | 92/143 X |

FOREIGN PATENT DOCUMENTS 12110 of 1884 United Kingdom .
919768 2/1963 United Kingdom ............... 254/228

Primary Examiner—Stuart S. Levy
Assistant Examiner—Joseph J. Hail, III
Attorney, Agent, or Firm—Baker & Kirk

[57] ABSTRACT

A hydropneumatic cable tensioner is comprised of an enclosed cylinder featuring a plurality of annular chambers. A fixed cable sheave is mounted to one end of the cylinder. A movable cable sheave is mounted to a piston rod connected to a piston which reciprocates in the innermost or piston bore chamber of the cylinder. Regulated compressed gas is connected to the outer chamber of the cylinder thereby exerting high pressure forces on oil found in the middle or high pressure oil chamber of the cylinder. Pressurized oil forces a piston to move outwardly thereby increasing the distance between the two sheaves and tensioning a cable. Restriction means within the piston bore chamber regulate movement of the piston and prevent uncontrolled acceleration should a cable failure occur.

8 Claims, 5 Drawing Figures

HYDROPNEUMATIC CABLE TENSIONER

FIELD OF THE INVENTION

The invention relates to the field of devices capable of maintaining tension on a cable or a wire rope line particularly for ship board applications. In the event of cable failure, the device is so constructed as to prevent sudden unrestrained movements which could damage the device.

DESCRIPTION OF THE PRIOR ART

In various applications involving cable lines subjected to varying forces, it is desirable to install a tensioning apparatus to prevent the forces exerted on the cable from exceeding a predetermined limit.

The prior art reveals that pneumatic pressure and hydraulic pressure have both been used to actuate such tensioning devices. A potential problem with cable tensioning devices using pneumatic pressure is that in the event of a cable failure, the force is exerted by the suddenly expanding pneumatic fluid, unless somehow restrained, can cause considerable damage to the tensioner and surrounding equipment.

Hydraulic powered cable tensioning devices do not suffer from the problem of unrestrained acceleration of a piston in the cylinder in the event of a cable failure. The Kerle, British Pat. No. 12,110, issued Sept. 6, 1884, illustrates a completely hydraulic cable tensioning device. In the Kerle device, there is no problem with unrestrained acceleration of the piston in the event of a cable failure because the piston cannot move in the cylinder any faster than the liquid can enter or leave the cylinder. The same can be said for the W. R. Mello, U.S. Pat. No. 3,120,157 issued Feb. 4, 1964, since it incorporates the completely hydraulic piston drive system. These prior art hydraulically actuated devices did not disclose means for preventing sudden violent and destructive movements of the piston in the event of a cable failure because the hydraulic system by design precluded such problems by limiting flow of hydraulic fluid to and from the cylinder thereby effectively controlling piston movements independent of cable tension exerted on such device.

The prior art also reveals cable tensioning mechanisms that are actuated by pneumatic pressure. The P. A. Orton, Sr., U.S. Pat. No. 2,588,037 issued Mar. 4, 1952, discloses a pneumatically actuated piston in the cylinder. The cylinder is equipped with an air vent located on the cylinder wall on the opposite side of the piston from the pneumatic pressure supply. Although as the inventor claims, the size of the air vent may be varied to effect the amount of dampening force applied to the piston, such dampening forces may not be sufficient to reduce piston speed in the event of a sudden load removal due to a cable failure.

More recent prior art devices have incorporated the use of a high pressure gas as the motive fluid in a cable tensioning device as well as restriction of a combined air/oil mixture downstream of a piston as a means of preventing uncontrolled piston acceleration in the event of a cable failure. Such devices require the use of external accumulators to hold a sufficient supply of high pressure gas to facilitate the functioning of the device. This type of device also requires the use of an external air/oil reservoir into which the air/oil mixture is displaced from the cylinder upon outward movements of the piston. Such devices requiring a multiplicity of high pressure reservoirs are heavy and tend to take up valuable space and require significant amounts of interconnecting piping and valving. The additional space and weight required by such designs present significant drawbacks in using said devices in applications where space and weight are at a premium as on offshore drilling rigs, for example.

The J. W. Prud'homme hydropneumatic cable tensioner, Pat. No. 3,314,657, issued Apr. 18, 1967 deals with pneumatically actuated cable tensioners which describe attempts to prevent sudden acceleration of the piston in the event of cable failure. The Prud'homme device prevents sudden piston acceleration after a cable failure by displacement of an air/oil mixture through the combination of a spring loaded valve and an opening both located in the cylinder walls and acting to restrict air/oil flow with a low pressure gas/oil reservoir which is fabricated around said cylinder. Use of the Prud'homme cable tensioner requires the incorporation of separate high pressure gas supply tanks externally connected to the device, to act as accumulators, in order for the device to properly respond to changes in cable tension. Furthermore, in order to accomodate ball check valves that permit flow between a low pressure air/oil reservoir and the cylinder bore, the diameter of the low pressure air/oil reservoir must be sufficiently increased to provide space for mounting such check valves. As a result, the device becomes unusually unweildly and heavy.

It is therefore an object of this invention to provide a hydropneumatic tensioner of compact design and reduced weight which will not require the connection of external high pressure gas accumulator vessels.

Another object of the invention is to provide a hydropneumatic cable tensioner which responds to a sudden cable failure by controlled movements of a piston with a cylinder.

Yet another object of the invention is to provide a hydropneumatic cable tensioner which restricts sudden movements of the device using a minimum of moving parts thereby tending to improve the operating life of the device.

SUMMARY OF THE INVENTION

The present invention relates to a new and improved apparatus for maintaining tension on a cable or a wire rope line. The apparatus maintains cable tension by varying the distance between a pair of sheaves around which a cable is strung. The device consists of a fixed sheave and a movable sheave connected to a piston in a cylinder featuring a plurality of interconnected annular chambers. The outer chamber contains a supply of compressed gas, the middle chamber contains oil pressurized by the gas from the outer chamber, and the central chamber houses the piston assembly which effectively controls tension by positioning a sheave connected to the end of the piston rod. During normal operation and in the event of cable failure, the device prevents uncontrolled acceleration of the piston by restricting flow of a lubricant through the chamber formed in front of the piston. The device contains a means for slowing the piston before it reaches its fully retracted position in the central chamber.

DETAILED DESCRIPTION OF THE DRAWINGS

DETAILED DESCRIPTION OF THE PREFERRED EMBODIMENT

Figure 1:
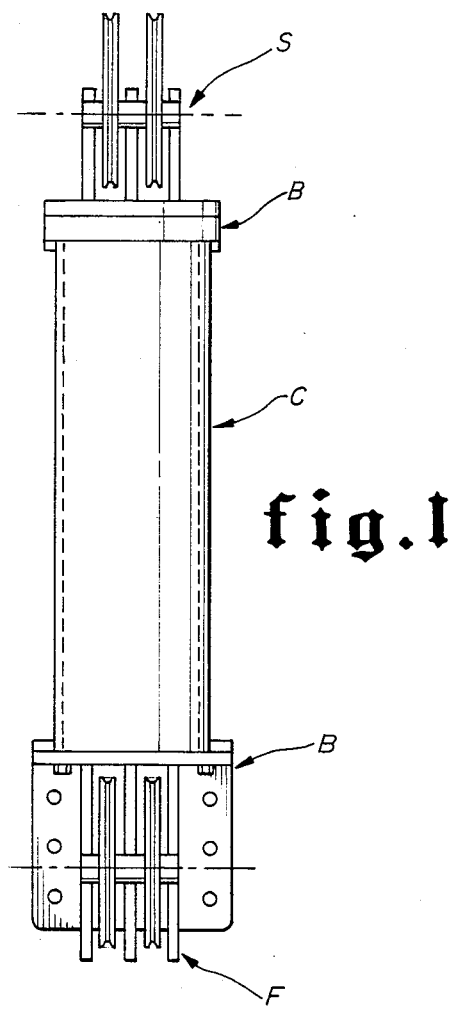
FIG. 1 is an elevation of a hydropneumatic cable tensioner with a sheave housing removed.
Figure 2:
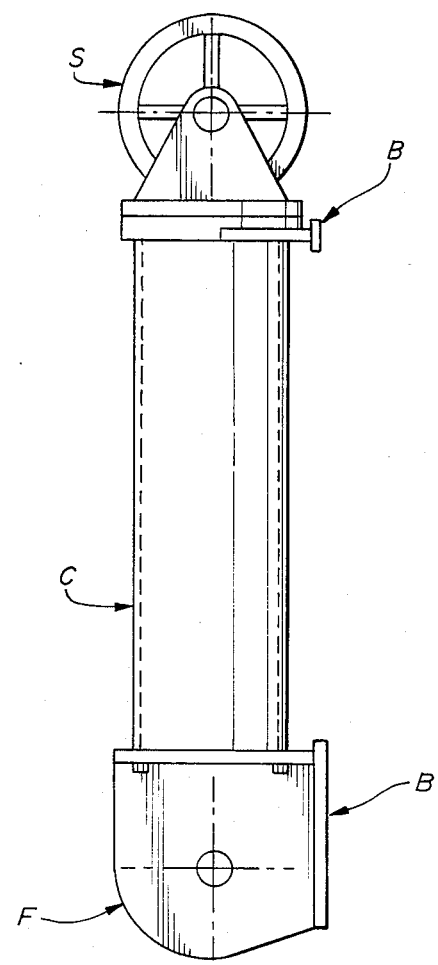
FIG. 2 is a side elevation of the structure illustrated in FIG. 1.
Figure 3:
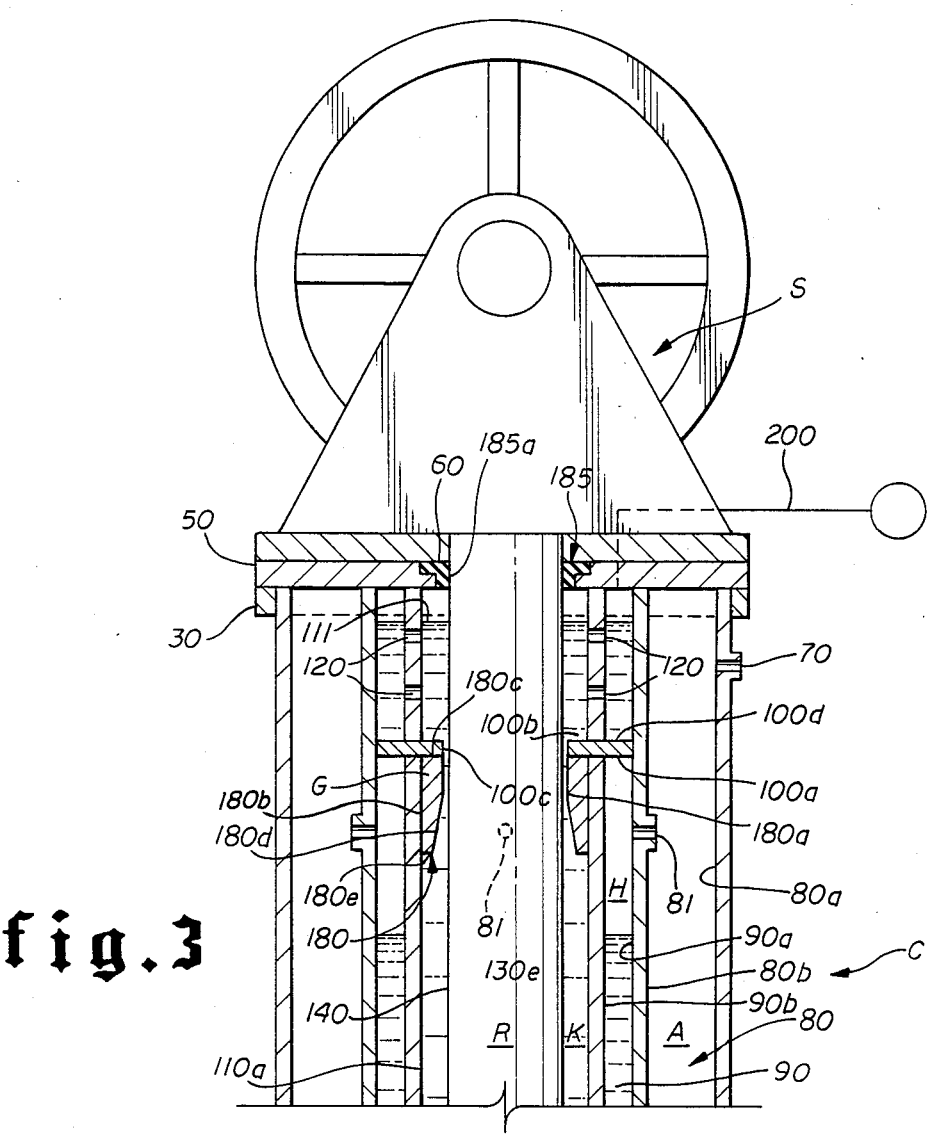
FIG. 3 is a cross-section on a longitudinal medium plane through the structure shown in FIG. 1 with the piston rod fully retracted.
Figure 3:
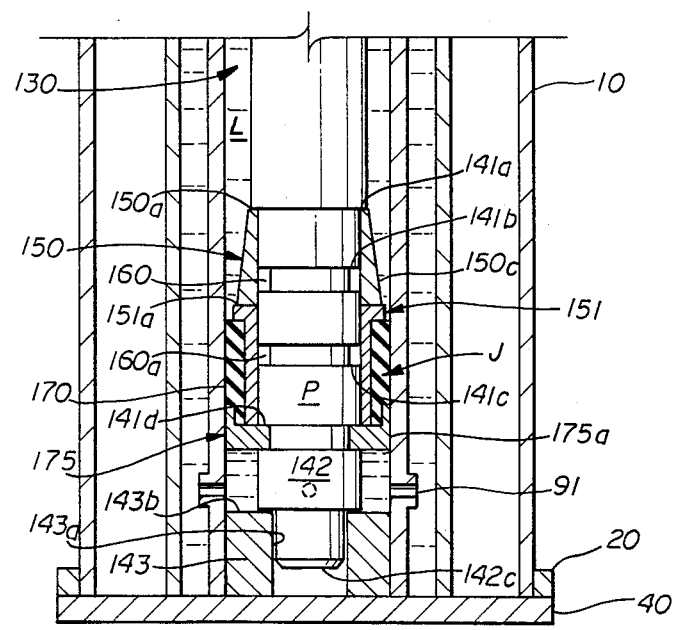

Referring to FIG. 1 of the drawings, the basic components of the hydropneumatic cable tensioner are shown to be: a base B; a cylinder C; a first cable sheave F; a second cable sheave S. Referring to FIG. 3, other basic components of the invention are illustrated such as a piston P; a piston rod R; restriction means G and piston sealing means J.

The cylinder C of the tensioner is attached to a fixed object such as a drilling ship or semi-submersible drilling rig, via base B. The cylinder C is constructed of a high strength steel or equivalent material to withstand operating pressure encountered during the operation of the tensioner. Within cylinder C on FIG. 3, starting at its longitudinal axis, there are several interconnected annular chambers: piston bore chamber K; high pressure oil chamber H; and accumulator chamber A. Cylinder C, also known as 10, is flanged on both ends. Flange 20 is connected at the lower end of cylinder 10 and flange 30 is connected at the upper end of cylinder 10. First enclosure means otherwise known as end plate 40 is bolted to flange 20 with appropriate gasket and bolts and nuts (not shown) thereby effectively enclosing the lower end of cylinder 10. Second enclosure means otherwise known as end plate 50 is bolted to flange 30 with appropriate gasket nuts and bolts (not shown) effectively sealing the upper end of cylinder 10 except for an opening 60 in end plate 50 to accomodate piston rod R. At the upper end of cylinder 10, a connection 70 is provided in the cylinder wall in order to admit compressed gas into the cylinder 10.

The connection 70 allows compressed gas to enter the accumulator chamber A, also known as 80, within cylinder 10. Accumulator chamber 80 is an annular space which is defined by vertical cylindrical surfaces 80a and 80b. End plate 40 and end plate 50 respectively define the lower and upper boundaries of accumulator chamber 80. There are four equally spaced radial ports 81 located in accumulator chamber 80 toward the upper end of surface 80b and equally spaced from end plate 50. The ports 81 permit fluid communication at a restricted rate between accumulator chamber 80 and high pressure oil chamber H, also called 90.

The high pressure oil chamber 90 is an annular chamber defined by vertical cylindrical surfaces 90a and 90b. The high pressure oil chamber extends from end plate 40 to surface 100a of transversely mounted disc 100 and contains an interface of air and oil. At the lower end of high pressure oil chamber 90 on surface 90b, there are a plurality of radial ports 91 equally spaced from each other and from end plate 40 which permit fluid communication at a restricted rate between high pressure oil chamber 90 and piston bore chamber K (FIG. 3A), also called 110. The working fluid in high pressure oil chamber 90 is approximately 100 gallons of a synthetic nonflammable lubricant (hereinafter "oil") and operates at pressures between 2500–3000 PSIG depending on supply pressure to accumulator chamber 80. The common wall between accumulator chamber 80 and high pressure oil chamber 90 is defined by surfaces 90a and 80b. Similarly, the common wall between piston bore chamber 110 and high pressure oil chamber 90 is defined by surfaces 110a and 90b.

Piston bore chamber 110 is defined by cylindrical surface 110a and extends from end plate 40 on its lower end to end plate 50 on its upper end. Transversely mounted disc 100 which contains a bore 100b, said bore having a smaller diameter than piston bore-chamber 110 defines a radial lip 100c within said piston bore chamber 110. Piston bore chamber 110 encompasses low pressure subchamber L also called 130 which is defined as that portion of piston bore chamber 110 between piston P and and restriction means G and is always full of oil. The oil in the low pressure oil subchamber 130 is the same as the oil in the high pressure oil chamber 90 and operates in a range of pressures of 15–50 PSIG depending on the velocity of piston P. Above annular lip 100c, low pressure subchamber 130, see FIG. 3, also includes a containment section 111 which comprises the annular space bounded by surfaces 90a, 90b, 100d and end plate 50 as well as the space bounded by surface 110a from surface 100d to end plate 50. A plurality of equally spaced radial ports 120 extending radially through piston bore 110 located between surface 100d and end plate 50, are sized to permit fluid communication at a restricted rate between the cylindrical segment of piston bore chamber 110 and the annular space.

Piston rod R, also called 140, reciprocates within piston bore chamber 110. Second cable sheave S, a device well known in the art, is connected by means of a suitable base plate (not shown) to the end of piston rod 140 which protrudes through opening 60 of end plate 50. The other end of piston rod 140 consists of a reduced diameter piston mounting section 141 thereby creating lip 141a. The reduced diameter piston mounting section 141 defines a plurality of circumferential grooves of which grooves 141b, 141c and 141d are shown. Piston rod R is further defined by an end section 142. The end section is formed by radial surface 142a, cylindrical surface 142b and end surface 142c. A stop ring 143 is mounted at the bottom of piston bore chamber 110. Inner surface 143a of stop ring 143 is of a slightly larger diameter than cylindrical surface 142b. A gap remains between surface 142c at the end of piston rod 140 and end plate 40 at the same time as radial surface 142a abuts stop ring top surface 143b when piston rod 140 is fully retracted in piston bore chamber 110. Oil displaced through the narrow gap between inner surface 143a and cylindrical surface 142b acts to retard piston movement as it reaches a fully retracted position.

Figure 3A:
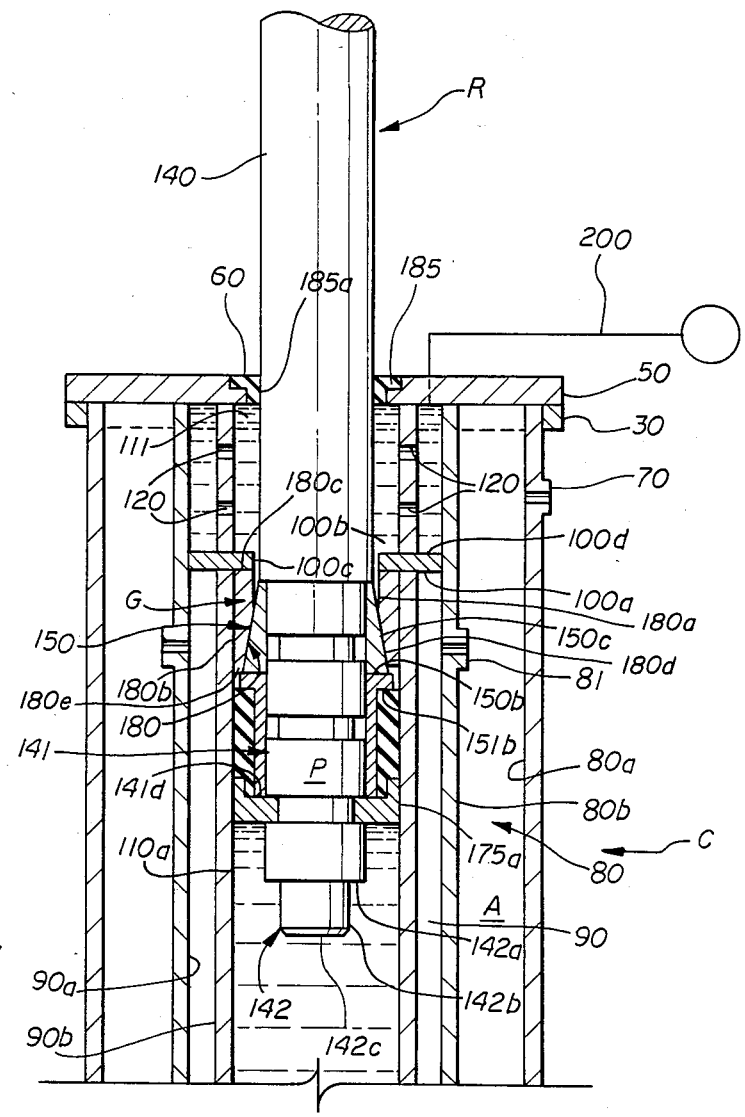
FIG. 3a is a cross-section on a longitudinal median plane through the structure shown in FIG. 1 with the sheaves being removed and the piston rod fully extended.
Figure 3A:
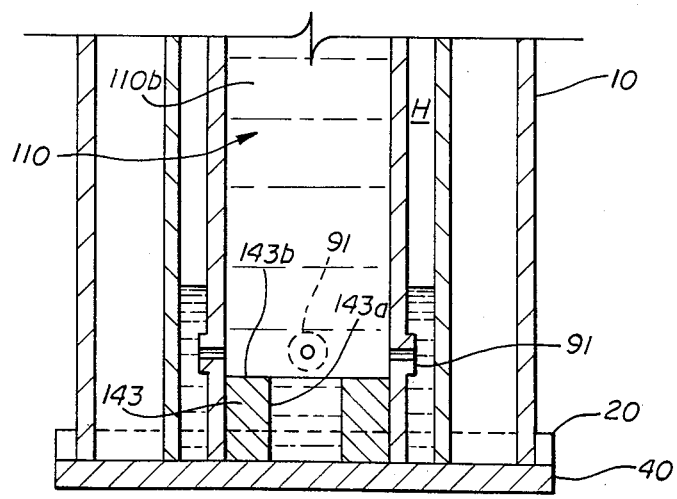

The piston P which, as seen in FIGS. 3 and 3A, is an assembly of parts mounted on the reduced diameter piston mounting section 141 of piston rod 140, cooperates with piston sealing means J to form an assembly which effectively divides piston bore chamber 110 into a high pressure segment 110b which is defined as the volume between end plate 40 and piston P and is always full of high pressure oil, and low pressure subchamber 130 which is defined as the volume between piston P and restriction means G and is always full of low pressure oil. Piston P is composed of several components. A conical frustum shaped support bushing 150 is fitted over the reduced diameter piston mounting section 141 of piston rod 140 until end surface 150a of support bushing 150 is in contact with lip 141a. A resilient ring 160 mounted in circumferential groove 141b may be used to seal between the reduced diameter piston mounting section 141 of piston rod 140 and support bushing 150, as desired. Piston seal bushing 151 is mounted over the reduced diameter piston mounting section 141 of piston rod 140 until end surface 151a of piston seal bushing 151 is in contact with end surface 150b of support bushing 150. A resilient ring 160a mounted in circumferential groove 141c may be used to prevent fluid leakage between the reduced diameter piston mounting section 141 and piston seal bushing 151 as desired. Piston seal bushing 151 also contains radial lip 151b which secures packing 170 (of a type well known in the art). The assembly of support bushing 150 and piston seal bushing 151 as well as the packing 170 are all retained in place on the reduced diameter piston mounting section 141 of piston rod 140 via split ring 175 mounted in circumferential groove 141d. Split ring 175 has an outer circumferential surface 175a which is of a diameter slightly smaller than the bore defined by cylindrical surface 110a thereby permitting split ring 175 to function not only as a packing retainer, but also as an integral component of the piston P. Circumferential groove 141d is so disposed along reduced diameter piston mounting section 141 of piston rod 140 such that when radial surface 142a abutts stop ring surface 143b, split ring 175 does not cover ports 91.

Restriction means G effectively restricts fluid flow between low pressure subchamber 130 and containment section 111 which in turn restricts movement of piston P. Oil displaced into containment section 111 compresses a gas initially present in the containment section 110 and forces fluid through ports 120. Both the compressive effect and the restriction afforded by ports 120 restrict piston P velocity. Restriction means G encompasses an annular ring 180. Inner cylindrical surface 180a is in sliding contact with piston rod 140 thereby guiding piston rod 141. Outer surface 180b is in contact with cylindrical surface 110a. Movement of annular ring 180 is prevented by a bolted connection (not shown) between its upper surface 180c and radial lip 100c. Inner tapered surface 180d located between cylindrical surface 180a and end surface 180e accepts tapered surface 150c of support bushing 150 thereby stopping further outward movement of piston P. Low pressure oil may flow along piston rod 140 in the clearance between surface 180a and piston rod 140 in both directions depending upon the direction of motion of piston P thereby restricting piston P velocity.

Oil that is displaced through the clearance between piston rod 140 and inner cylindrical surface 180a of annular ring 180 is prevented from escaping along piston rod 140 through end plate 50 by virtue of wiper seal 185 mounted in end plate 50 around opening 60. Inner surface 185a of wiper seal 185 is in sliding contact with piston rod 140 thereby preventing escape of fluids along piston rod 140 as it reciprocates in the piston bore chamber 110.

A relief valve 200 of a type well known in the art is mounted in end plate 50 and communicates with the containment section 111 of the low pressure subchamber 130.

Figure 4:
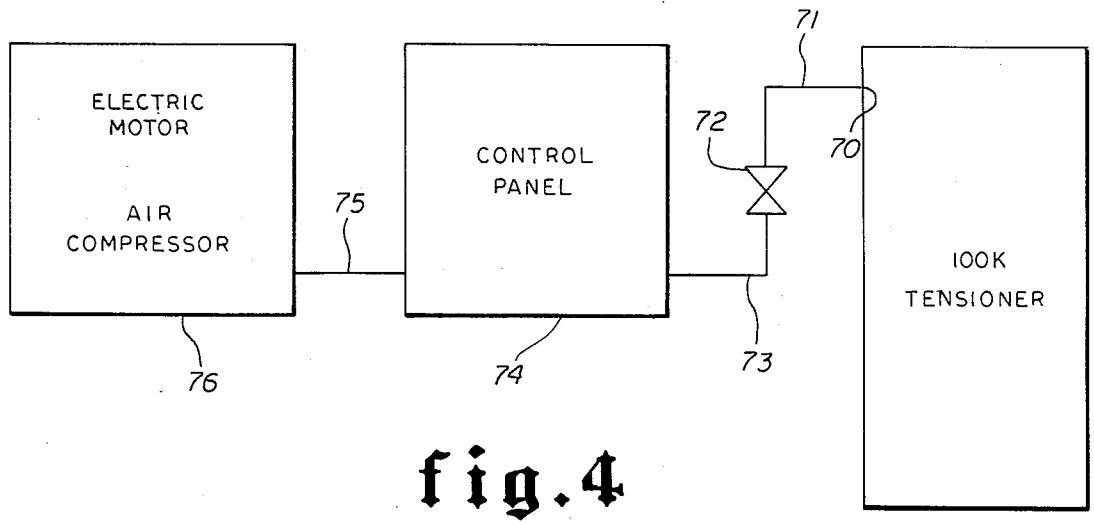
FIG. 4 is a schematic view of the hydropneumatic cable tensioner illustrating auxillary equipment used to produce a regulated gas supply to the tensioner.

FIG. 4 shows schematically the connection of a regulated gas supply to the tensioner. Compressed gas is provided by a motor driven compressor 76 or any alternative compressed gas source and is connected via conduit 75 to a control panel 74. Control panel 74 contains regulation means of a type well known in the art to restrict supply pressures to the tensioner to a maximum of 3000 PSIG. The control panel 74 is connected to the tensioner via conduit 73 which is connected to a valve 72 which is in turn connected to connection 70 on cylinder 10 by way of conduit 71. Several tensioners may be connected to control panel 74.

The tensioner is placed in operation by reaving a cable (not shown) around first cable sheave F and second cable sheave S and finally to a load (not shown). In a typical application on board a ship, tension on the cable may vary with movements of the ship on the waterline. In the event of a decrease in tension on the cables, pneumatic pressure exerted by the compressed gas found in accumulator chamber 80 is exerted on the oil in high pressure oil chamber 90 through ports 81. When slack developes in the cable, pneumatic pressure acting on the oil in high pressure oil chamber 90 forces such oil into the high pressure segment 110b of piston bore chamber 110 thereby exerting a force on the surfaces 142a and 142c as well as on split ring 175. Movement of high pressure oil into piston bore chamber 110 acts to lubricate surface 110a to prevent friction damage to split ring 175. As a result of such pressure and slackening of tension on the cables, piston P forces piston rod 140 to move outwardly by displacing oil from low pressure subchamber 130 through the restricted opening between piston rod 140 and cylindrical surface 180a of restriction means 180. As a result of said displacement of oil from low pressure subchamber 130 to containment section 111, a gas phase in containment section 111 is compressed. Such compression along with the restriction to flow provided by ports 120 effectively combine to control piston speed. Outward movement of piston rod 140 increases the distance between first cable sheave F which is stationary and second cable sheave S which is mounted on the end of piston rod 140 thereby taking up the slack.

If the tension suddenly increases on the cable, the tensioner will compensate by the movement of second cable sheave S closer to first cable sheave F. To accomplish this movement, the additional tension exerted on the cable will force the piston P to move toward end plate 40 which in turn will draw oil from containment section 111 through the opening between piston rod 140 and cylindrical surface 180a into low pressure subchamber 130 and simultaneously displace some high pressure oil from high pressure segment 110b of piston bore chamber 110 through ports 91 back into high pressure oil chamber 90 thereby compressing the gas in the accumulator chamber 80. In either direction, in order for piston P to move, fluid must be displaced through the opening between piston rod 140 and surface 180a of annular ring 180.

The rate of movement of piston P in either direction is limited by the rate at which oil can be displaced through the opening between piston rod 140 and annular ring 180 as well as the rates oil can pass through ports 120 and 91 and gas through ports 81. One skilled in the hydraulic art taking into consideration the dimensions of the compartments of the tensioner, the desired maximum piston speed, the loads exerted on the piston by the cable, the physical properties of the fluids involved and allowing for appropriate pressure drops can readily calculate the required open areas for ports 81, 91, 120 and the open area between piston rod 140 and surface 180*a* of annular ring 180.

Should a cable failure occur which would immediately remove all the load on the tensioner, ports 81, 91, 120 and the gap between piston rod 140 and annular ring 180 are sized so as to prevent sudden and uncontrolled acceleration of piston P. In the event of a sudden loss of load, piston P will be restricted to movement at a safe speed whereupon the piston will reach maximum extension when conical frustum shaped support bushing 150 contacts annular ring tapered surface 180*d*.

The foregoing disclosure and description of the invention are illustrative and explanatory thereof, and various changes in the size, shape and materials, as well as in the details of the illustrated construction may be made without departing from the spirit of the invention.

I claim:

1. A hydropneumatic cable tensioner comprising:

a base;

a cylinder mounted on said base;

a first enclosure means for enclosing one end of said cylinder;

a first cable sheave mounted to said first enclosure means;

a piston bore chamber within said cylinder;

a piston reciprocable in said piston bore chamber comprising a conical frustum shaped support bushing fitted onto a reduced diameter piston mounting section and butted up to a shoulder on said piston rod; a piston seal bushing fitted over said reduced diameter piston moving section abutting said support bushing and covering a plurality of grooves on said reduced diameter piston mounting section of said piston rod; and securing means mounted in another of said grooves on said reduced diameter piston mounting section for retaining a piston sealing means onto an axial lip of said seal bushing and for retaining said seal bushing against said support bushing;

a piston rod connected to said piston comprising a reduced diameter piston mounting section thereby forming a shoulder on said piston rod; and a plurality of circumferential grooves defined by said reduced diameter piston mounting section;

a second enclosure means for enclosing the other end of said cylinder said second enclosure means adapted to permit said piston rod to extend therethrough;

a second cable sheave mounted on the opposite end of said piston rod from where said piston is attached;

a low pressure subchamber within said piston bore chamber;

a high pressure oil chamber surrounding said piston bore chamber, said high pressure oil chamber ported to permit flow between said piston bore chamber and said high pressure oil chamber;

an accumulator chamber within a cylinder surrounding said high pressure oil chamber said accumulator chamber ported to permit flow between said high pressure oil chamber and said accumulator chamber;

piston sealing means for preventing oil from the high pressure oil chamber from entering said low pressure subchamber comprising a plurality of packing rings mounted on said lip of said seal bushing;

restriction means secured within said low pressure subchamber for controlling fluid flow within said piston bore thereby limiting piston velocity in the event of a sudden loss of cable tension and for guiding said piston rod in its reciprocal movements comprising an annular ring fitted within said low pressure subchamber having an inner face positioned around said piston rod; a small gap defined as the space between said annular ring and said piston rod whereupon movement of said piston, fluid flow is restricted within said low pressure subchamber resulting in regulation of piston velocity;

containment means within said piston bore for containing an initial charge of gas, and oil displaced through said restriction means; and means for introducing regulated compressed gas to said accumulator chamber to pressurize said accumulator chamber wherein oil in said high pressure oil chamber is also pressurized thereby urging said piston to move outwardly which in turn urges said piston rod connected thereto to move outwardly through said second enclosure means thereby tensioning the cable.

2. The device as in claim 1, wherein said restriction means further comprises:

an annular ring fitted within said low pressure subchamber having an inner face positioned around said piston rod;

a small gap defined as the space between said annular ring and said piston rod whereupon movement of said piston, fluid flow is restricted within said low pressure subchamber resulting in regulation of piston velocity.

3. The device of claim 2, wherein said annular ring further comprises:

an inner tapered surface, said tapered surface to accomodate said conical frustum shaped support bushing of said piston on outward movement of said piston resulting in the application of a combination of longitudinal and oblique forces applied to said conical frustum shaped support bushing effectively preventing further outward movement of said piston.

4. The device in claim 2, wherein said restriction means comprises:

a disc having a central bore mounted transversely to the central axis of said piston rod, said disc dividing said low pressure oil chamber, effectively converting a portion of said low pressure oil chamber into an extension of said containment means, the bore in said disc being of a smaller diameter than the diameter of the low pressure subchamber of said piston bore chamber thereby forming a radial lip to secure said annular ring against movement; and said containment means further contains:

a plurality of radial ports defined by the wall of said piston bore between said disc and said second enclosure means restricting fluid flow between said extension of said containment means created by said disc and said containment means thereby limiting piston velocity.

5. The device in claim 3 or 4, wherein said porting between said accumulator chamber and said high pressure oil chamber further comprises:

four radial equally spaced openings defined by the common wall between said accumulator chamber and said high pressure oil chamber, and sized as to restrict flow between said high pressure oil chamber and said accumulator chamber thereby controlling piston velocity.

6. The device in claim 5, wherein said porting between said high pressure oil chamber and said piston bore further comprises:

four radial equally spaced ports defined by the common wall between said high pressure oil chamber and said piston bore and sized so as to restrict flow between said high pressure oil chamber and said piston bore thereby limiting piston velocity.

7. The device of claim 6, wherein said piston bore comprises:

an annular stop ring mounted to said first enclosure means, said stop ring further containing a central bore on the same axis as said piston bore; and said piston rod further comprises:

a step, said step located between said reduced diameter piston mounting section and the inner end of said piston rod, said step defining a cylindrical surface disposed to reciprocate within said central bore of said stop ring when said piston reaches its fully retracted position, whereupon said high pressure oil is displaced from between said central bore of said stop ring and said cylindrical surface of said piston rod thereby reducing the velocity of said piston rod before said step on said piston rod impacts said stop ring.

8. The device of claim 7 wherein said containment means further comprises:

a resilient seal located within said second enclosure means fitted around said piston rod to prevent escape of fluids from said cylinder.

* * * * *